United States Patent [19]

Outlaw

[11] Patent Number: 4,828,817
[45] Date of Patent: May 9, 1989

[54] METHOD FOR PRODUCING AN ATOMIC OXYGEN BEAM

[75] Inventor: Ronald A. Outlaw, Newport News, Va.

[73] Assignee: The United States of America as represented by the Administrator of the National Aeronautics and Space Administration, Washington, D.C.

[21] Appl. No.: 113,955

[22] Filed: Oct. 29, 1987

[51] Int. Cl.$^4$ ............................................ B01D 53/32
[52] U.S. Cl. .................... 423/579; 204/157.41; 204/157.44; 204/157.45; 250/251
[58] Field of Search ............... 204/157.44, 157.41, 204/157.5; 250/251; 423/579

[56] References Cited

U.S. PATENT DOCUMENTS

| | | |
|---|---|---|
| 3,143,647 | 8/1964 | Gunther et al. . |
| 3,341,352 | 9/1967 | Ehlers . |
| 3,359,705 | 12/1967 | Mullhaupt . |
| 3,876,957 | 4/1975 | Thatcher . |
| 3,969,481 | 7/1976 | Murray et al. . |
| 4,261,863 | 4/1981 | Kent et al. . |
| 4,488,951 | 12/1984 | Nolan et al. . |
| 4,542,010 | 9/1985 | Roman et al. . |
| 4,585,945 | 4/1986 | Bruel et al. . |
| 4,599,157 | 7/1986 | Suzuki et al. . |
| 4,602,987 | 7/1986 | Bonaventura et al. . |
| 4,686,022 | 8/1987 | Rempt ............................ 204/157.41 |

FOREIGN PATENT DOCUMENTS 4617029 10/1986 et al. .

Primary Examiner—John Doll
Assistant Examiner—Wayne A. Langel
Attorney, Agent, or Firm—George F. Helfrich; John R. Manning; Charles E. B. Glenn

[57] ABSTRACT

A method for producing an atomic oxygen beam is provided by the present invention. First, a material 10' is provided which dissociates molecular oxygen and dissolves atomic oxygen into its bulk. Next, molecular oxygen is exposed to entrance surface 11' of material 10'. Next, material 10' is heated by heater 17' to facilitate the permeation of atomic oxygen through material 10' to the UHV side 12'. UHV side 12' is interfaced with an ultra-high vacuum (UHV) environment provided by UHV pump 15'. The atomic oxygen on the UHV side 12' is excited to a non-binding state by exciter 14' thus producing the release of atomic oxygen to form an atomic oxygen beam 35'.

10 Claims, 2 Drawing Sheets

METHOD FOR PRODUCING AN ATOMIC OXYGEN BEAM

ORIGIN OF THE INVENTION

The invention described herein was made by an employee of the U.S. Government and may be manufactured and used by or for the government for governmental purposes without the payment of any royalties thereon or therefor.

TECHNICAL FIELD OF THE INVENTION

This invention relates generally to the separation of oxygen molecules into atoms and more particularly to the production of a high purity, neutral hyperthermal atomic oxygen beam.

BACKGROUND OF THE INVENTION

The production of a laboratory atomic oxygen beam is useful in a variety of applications. For example, researchers need to simulate the flux and energy of atomic oxygen encountered by space vehicles in the upper atmosphere. The high chemical reactivity of this atomic oxygen flux causes substantial degradation of organic materials, thereby resulting in reduced material lifetimes. Also, such an atomic oxygen beam may be used in the calibration of mass spectrometers and other detection systems which are utilized in determining the densities of the gases within the flight envelope of spacecraft in low Earth orbit. Other applications include studying the kinetic properties of atomic oxygen as it collides with other molecules, determining drag coefficients, and studying basic interaction between atomic oxygen and surfaces.

Currently, numerous methods are used to generate atomic oxygen beams. For example, radio frequencies or microwaves excite an oxygen bearing gas to create a gas discharge which includes atomic oxygen and other species. Second, oxygen molecules are heated in the vicinity of a surface until oxygen atoms are thermally dissociated. Third, electrons are impacted against an oxygen bearing gas to create oxygen ions, which are mass separated and neutralized to atomic oxygen by a charge transfer cell. All prior methods share a combination of the following problems: low flux density, low mean energy, wide eergy distribution, numerous excited states of oxygen and accompanying gases, and synergistic reactions from different species. More significantly, these methods result in a high contamination background density of molecular oxygen or other gas products which distort the true interaction between the atomic oxygen and the sample material. For example, if the background pressure is $1 \times 10^{-6}$ Torr, the entire surface of the sample is covered in one second by gases such as CO and molecular oxygen, thereby preventing a clear distinction between the effects of these reactive gases and atomic oxygen.

Accordingly, it is a primary object of this invention to generate an atomic oxygen beam which closely simulates low Earth orbit conditions.

It is a further object of this invention to accomplish the above object without the contamination which is characteristic of the prior art.

Other objects and advantages of this invention will become apparent in the specification and drawings which follow.

SUMMARY OF THE INVENTION

According to the present invention, the foregoing and additional objects are obtained by the following method for generating a pure atomic oxygen beam. An ultra high vacuum (UHV) environment is interfaced with a material containing atomic oxygen. This material contains atomic oxygen after being heated and exposed to molecular oxygen. The molecular oxygen dissociates into atomic oxygen at the surface. The atomic oxygen then dissolves in the bulk of the material. The material is heated to a temperature which facilitates transport of the atomic oxygen to the ultra-high vacuum interface, where it stays on the surface in the atomic state The surface atomic oxygen is excited to a non-bonding state and released to the gas phase by either an electron beam or a photon beam. The material temperature is maintained low enough to prevent surface oxygen from recombining to molecular oxygen. The resulting oxygen beam can be further purified by removal of positive or negative oxygen ions by using grids at the appropriate potential. Accordingly, an essentially pure beam of atomic oxygen is produced in the terrestrial laboratory at sufficient flux and energy levels to simulate conditions in a low Earth orbit.

DETAILED DESCRIPTION OF THE INVENTION

Figure 1:
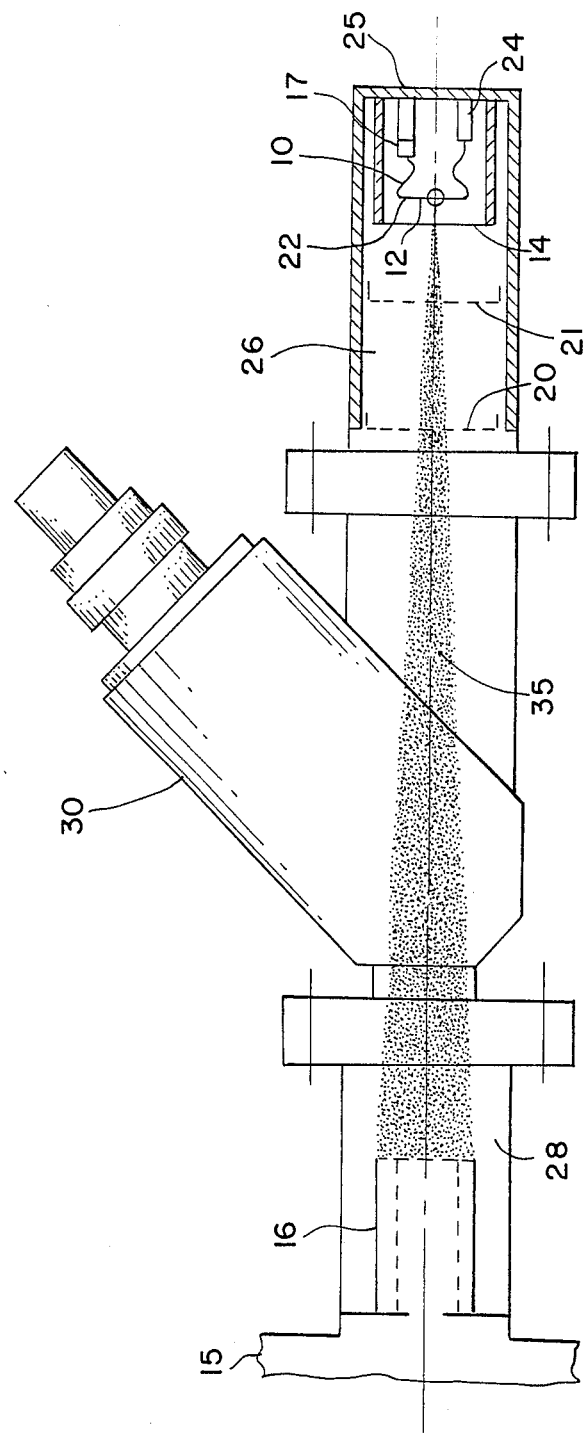
FIG. 1 is a pictoral view of a specific embodiment of the present invention.

Referring to FIG. 1, a material 10 is shown which has a high oxygenic solubility and diffusivity and which dissociates moleuular oxygen ($O_2$) and dissolves atomic oxygen (O) into its bulk. Examples of such a material include silver, zirconium, titanium, and hafnium.

Material 10 may be a source of atomic oxygen as the result of one of two processes. In the first specific embodiment of the present invention, the material 10 is pre-charged with oxygen. Material 10 is a polycrystalline wire located within chamber 26. The wire is bent into a hairpin shape to provide minimal temperature variation along the straight portion 22 of material 10. The wire is cleaned and then resistively heated to approximately 500° C., as measured by thermocouple 24. Next, material 10 is charged with $O_2$, which is introduced into chamber 26 at a pressure ranging from 0.1 to 1000 Torr, for approximately one hour. Next, chamber 26 is maintained at a temperature of approximately 200° C. at a pressure of $1 \times 10^{-8}$ Torr for approximately 12 hours. During this bake-out period, the temperature of material 10 in chamber 26 is maintained below 20° C. to minimize any loss of oxygen. Isolation valve 30 remains closed during this bake-out period. As chamber 26 cools, material 10, and grids 20 and 21 are degassed. After this cooling is complete, the pressure in chamber 26 becomes UHV (less than $1 \times 10^{-9}$ Torr) Isolation valve 30 is then opened to mass spectrometer detection device 16. The pressure of chambers 26 and 28 is then lowered to approximately $5 \times 10^{-12}$ Torr. At this time the wire is resistively heated to a temperature sufficient to promote atomic oxygen diffusion to the surface, and subjected to electron or photon bombardment to produce the atomic oxygen beam, as described below. If material 10 is silver, a sufficient temperature is 500° C.

Figure 2:
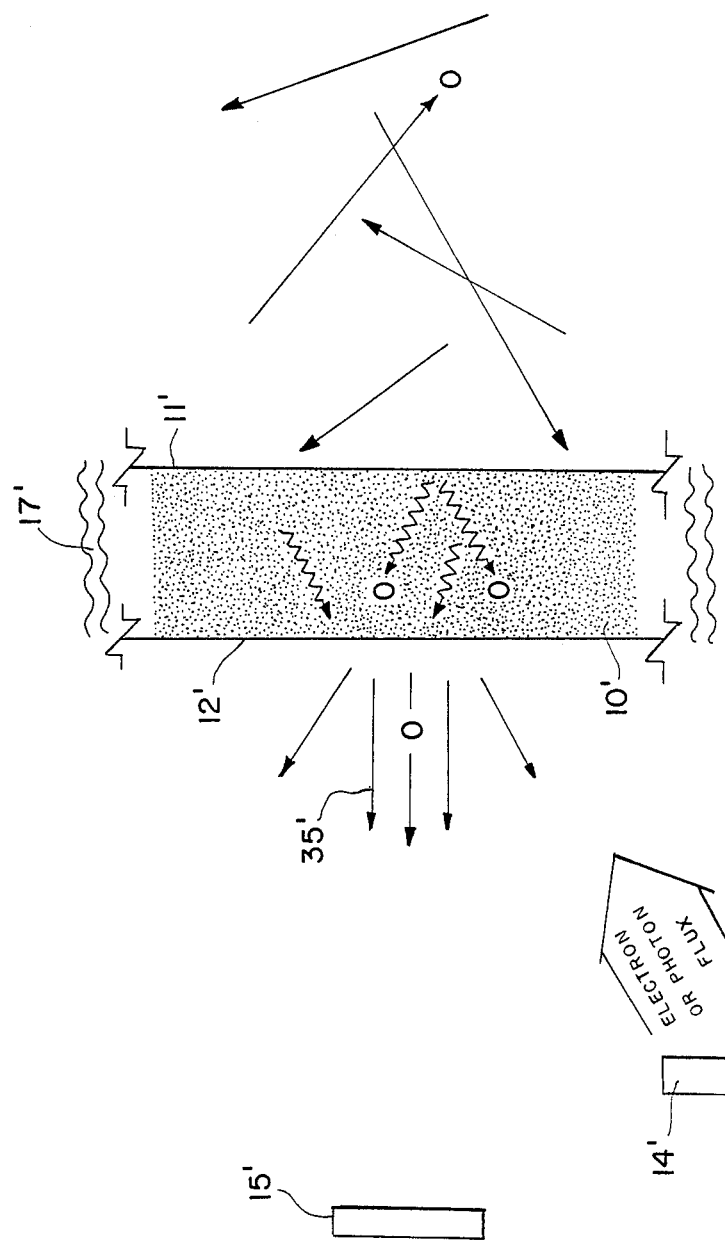
FIG. 2 is pictoral view of another specific embodiment of the present invention.

Alternatively, in the second embodiment of the present invention material 10 may be a source of atomic oxygen by the following process. Referring now to FIG. 2, material 10' is a thin membrane. Material 10' may be of a thickness of approximately a quarter of a millimeter. Molecular oxygen at a pressure ranging between 0.1 and 1000 Torr is introduced to the entrance surface 11' of material 10'. This second embodiment allows for a continuous flux of oxygen atoms to be produced.

Material 10' is heated between approximately 300° C. and approximately 800° C. by a heater 17' while being exposd to $O_2$. This heating allows for control of the amount of atomic oxygen passing through material 10'. This heating by heater 17' may be accomplished by an electrical resistance heater located outside the vacuum system. Also, the upstream pressure of $O_2$ against entrance surface 11' in the second embodiment of the present invention aids in this control of atomic oxygen.

In the second embodiment, $O_2$ is adsorbed onto entrance surface 11' of material 10'. Next, the $O_2$ dissociates into O and dissolves into the bulk of material 10'.

Next, the atomic oxygen exits the bulk of material 10' and becomes an adsorbed atomic layer at UHV side 12'. The temperature of UHV side 12' should be less than 500° C. when material 10' is silver. When the O atoms arrive at UHV side 12', surface diffusion occurs at temperatures above 550° C., which results in O atom collisions and subsequent recombination into desorbed $O_2$ molecules. To prevent recombination, the O atoms must remain in the adsorbed state by maintaining UHV side 12' below 500° C. An ultra-high vacuum pump 15' is located on the UHV side 12' of material 10'. This vacuum pump 15' provides a clean, non-contaminating environment on the UHV side 12' with a pressure of 1 to $5 \times 10^{-12}$ Torr.

Next, the O atoms are desorbed from UHV side 12' or 12 by exciter 14' or 14 to form atomic oxygen beam 35' or 35. Exciter 14' or 14 may excite the atomic oxygen to a non-binding state in one of two ways. First, exciter 14' or 14 may direct low energy electrons with an energy level of approximately 100 to 500 electron-Volts (eV) at UHV side 12' or 12. These electrons should have a current density of at least 0.5 milliamps per square centimeter upon UHV side 12 and is another control of the atomic oxygen flux. Exciter 14' or 14 may be a tungsten filament. In the second specific embodiment, exciter 14' is a tungsten filament which is placed parallel to material 10' and is located approximately two millimeters from UHV side 12'. The tungsten filament is resistively heated to provide the desired low energy electrons. This technique is referred to as electron stimulated desorption (ESD).

Second, exciter 14' or 14 may be photon emitter which directs a high flux of photons at UHV side 12' or 12 to excite the exciting O atoms to non-binding states. These photons should also have an energy level sufficient to desorb the O atoms. This technique is referred to as photon stimulated desorption (PSD).

The majority of the O atoms desorbing from UHV side 12 in atomic oxygen beam 35 are desired O neutrals. However, a small percentage of the O atoms are positively charged atomic oxygen. To prevent these charged particles from being present in the atomic oxygen beam, grid 20 is provided. Grid 20 is charged with a negative bias and thereby sweeps aside any positively charged O atoms. An even smaller percentage of the exiting O atoms are negatively charged. Positively charged grid 21 sweeps aside the negatively charged O atoms.

Enclosure 25 surrounds material 10, exciter 14, and cylindrical grids 20 and 21. Since atomic oxygen is extremely reactive to metals, enclosure 25 should be composed of a material which has a small recombination coefficient for O to $O_2$. Preferably, enclosure 25 is comprised of silicon dioxide ($SiO_2$), which has a recombination coefficient of approximately $10^{-4}$.

Accordingly, the present invention produces an atomic oxygen beam 35 or 35' which is essentially pure and contains neutral atomic oxygen with an energy level ranging from approximately 1 eV to 10 eV. This atomic oxygen beam 35 has a flux of up to $10^{15} cm^{-2} s^{-}$. Also, the low background pressure created by the ultra-high vacuum 15 allows for less reaction products between the atomic oxygen beam 35 or 35' and any reactive gases. Thus, the present invention produces an atomic oxygen beam 35 which simulates low Earth orbit conditions.

We claim:

1. A method of producing an atomic oxygen beam comprising:
   providing a material having two sides, which material dissociates molecular oxygen and dissolves atomic oxygen into its bulk:
   exposing one side of said material to molecular oxygen;
   providing an ultra high vacuum environment of a pressure of less than $1 \times 10^{-9}$ Torr on the other side of said material;
   heating said material to a sufficient temperature to promote atomic oxygen permeation to the other side of said material;
   exciting atomic oxygen to a non-binding state which results in its release from the other side of said material as an excited atomic oxygen beam.

2. The method of claim 1 wherein the excited atomic oxygen beam is exposed to a negatively charged means to remove positively charged atomic oxygen from the beam.

3. The method of claim 1 wherein the excited atomic oxygen beam is exposed to a positively charged means to remove negatively charged atomic oxygen from the beam.

4. The method of claim 1 wherein the said material is selected from the group consisting of silver, zirconium, titanium, and hafnium.

5. The method of claim 1 wherein the step of exciting the atomic oxygen to a non-binding state includes bombarding said material with electrons at the side of the ultra high vacuum environment.

6. The method of claim 1 wherein the step of exciting the atomic oxygen to a non-binding state includes bombarding said material with photons at the side of the ultra high vacuum environment.

7. A method of producing an atomic oxygen beam comprising:
   providing a material which dissociates molecular oxygen and dissolves atomic oxygen into its bulk;
   placing said material in a chamber;
   heating said material to at least approximately 500° C.;
   exposing said material to molecular oxygen at a pressure between approximately 0.1 to 1000 Torr;
   heating said chamber to approximately 200° C. at a pressure of approximately $1 \times 10^8$ Torr while maintaining said material at a temperature of 20° C.;

providing an ultra-high vacuum environment of less than $1 \times 10^{-9}$ Torr to said exposed material;

heating said exposed material to a sufficient temperature to promote atomic oxygen diffusion to the surface of said material;

exciting atomic oxygen to a nonbinding state which results in its release from the surface of said material as an atomic oxygen beam.

8. The method of claim 7 wherein the said material is selected from the group consisting of silver, zirconium, titanium, and hafnium.

9. The method of claim 7 wherein the step of exciting the atomic oxygen to a non-binding state includes bombarding said material with electrons at the side of the ultra high vacuum environment.

10. The method of claim 7 wherein the step of exciting the atomic oxygen to a non-binding state includes bombarding said material with photons at the side of the ultra high vacuum environment.

* * * * *